United States Patent
Nachenberg et al.

(10) Patent No.: US 9,246,931 B1
(45) Date of Patent: *Jan. 26, 2016

(54) COMMUNICATION-BASED REPUTATION SYSTEM

(71) Applicant: Symantec Corporation, Mountain View, CA (US)

(72) Inventors: Carey S. Nachenberg, Northridge, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/535,733

(22) Filed: Nov. 7, 2014

Related U.S. Application Data

(63) Continuation of application No. 12/407,772, filed on Mar. 19, 2009, now Pat. No. 8,904,520.

(51) Int. Cl.
*H04L 29/06* (2006.01)
*G06F 21/56* (2013.01)

(52) U.S. Cl.
CPC ............ *H04L 63/1425* (2013.01); *G06F 21/56* (2013.01); *G06F 2221/034* (2013.01)

(58) Field of Classification Search
USPC ......................................................... 726/23
See application file for complete search history.

(56) References Cited

U.S. PATENT DOCUMENTS

| | | | |
|---|---|---|---|
| 6,233,606 B1 | 5/2001 | Dujari | |
| 6,347,332 B1 | 2/2002 | Malet et al. | |
| 6,556,989 B1 | 4/2003 | Naimark et al. | |
| 7,197,539 B1 | 3/2007 | Cooley | |
| 7,272,719 B2 | 9/2007 | Bleckmann et al. | |
| 7,281,270 B2 | 10/2007 | Piesco et al. | |
| 7,412,516 B1 | 8/2008 | Brown et al. | |
| 7,448,084 B1 | 11/2008 | Apap et al. | |
| 7,472,420 B1 | 12/2008 | Pavlyushchik | |
| 7,546,349 B1 | 6/2009 | Cooley | |
| 7,562,304 B2 | 7/2009 | Dixon et al. | |
| 7,565,358 B2 | 7/2009 | Minogue et al. | |
| 7,587,367 B2 | 9/2009 | Mengerink | |
| 7,668,951 B2 | 2/2010 | Lund et al. | |
| 7,765,481 B2 * | 7/2010 | Dixon ................... | G06Q 30/02 705/26.8 |
| 7,783,741 B2 | 8/2010 | Hardt | |
| 7,854,007 B2 | 12/2010 | Sprosts et al. | |

(Continued)

FOREIGN PATENT DOCUMENTS

WO  WO 2009/076555 A2  6/2009

OTHER PUBLICATIONS

Hwang, Kai, Sameer Kulkareni, and Yue Hu. "Cloud security with virtualized defense and reputation-based trust mangement." Dependable, Autonomic and Secure Computing, 2009. DASC'09. Eighth IEEE International Conference on. IEEE, 2009.*

(Continued)

*Primary Examiner* — Harris C Wang
(74) *Attorney, Agent, or Firm* — Fenwick & West LLP

(57) ABSTRACT

A communication between an entity and a host is identified. Reputation information associated with a set of other entities that communicate with the host is identified. A reputation score associated with the host is generated based on the reputation information associated with a set of other entities. A reputation score associated with the entity is generated based on the reputation score associated with the host.

19 Claims, 6 Drawing Sheets

(56) References Cited

U.S. PATENT DOCUMENTS

| | | | |
|---|---|---|---|
| 7,870,608 B2 | 1/2011 | Shraim et al. | |
| 7,941,853 B2 | 5/2011 | Rozenberg et al. | |
| 8,001,606 B1 | 8/2011 | Spertus | |
| 8,019,689 B1 | 9/2011 | Nachenberg | |
| 8,065,731 B1 | 11/2011 | Nucci et al. | |
| 8,200,587 B2 | 6/2012 | Deyo | |
| 8,250,657 B1 | 8/2012 | Nachenberg et al. | |
| 8,312,536 B2 | 11/2012 | Nachenberg et al. | |
| 8,327,131 B1 | 12/2012 | Hardjono et al. | |
| 8,341,745 B1 | 12/2012 | Chau et al. | |
| 8,381,289 B1 | 2/2013 | Pereira et al. | |
| 8,392,997 B2 | 3/2013 | Chen et al. | |
| 8,413,251 B1 | 4/2013 | Gibney et al. | |
| 8,904,520 B1 | 12/2014 | Nachenberg et al. | |
| 2002/0046041 A1* | 4/2002 | Lang | G06Q 30/02 705/347 |
| 2002/0156668 A1 | 10/2002 | Morrow et al. | |
| 2003/0167308 A1 | 9/2003 | Schran | |
| 2004/0054661 A1 | 3/2004 | Cheung et al. | |
| 2004/0138965 A1 | 7/2004 | Laughlin et al. | |
| 2005/0050335 A1 | 3/2005 | Liang | |
| 2005/0268090 A1 | 12/2005 | Saw et al. | |
| 2005/0283837 A1* | 12/2005 | Olivier | H04L 63/145 726/24 |
| 2006/0026123 A1 | 2/2006 | Moore et al. | |
| 2006/0085328 A1 | 4/2006 | Cohen et al. | |
| 2006/0212270 A1 | 9/2006 | Shiu et al. | |
| 2006/0212925 A1* | 9/2006 | Shull | G06F 21/55 726/1 |
| 2006/0212930 A1 | 9/2006 | Shull et al. | |
| 2006/0212931 A1 | 9/2006 | Shull et al. | |
| 2006/0218642 A1 | 9/2006 | Kuppusamy et al. | |
| 2006/0230039 A1 | 10/2006 | Shull et al. | |
| 2006/0253458 A1 | 11/2006 | Dixon et al. | |
| 2006/0253581 A1 | 11/2006 | Dixon et al. | |
| 2006/0253583 A1 | 11/2006 | Dixon et al. | |
| 2006/0253584 A1* | 11/2006 | Dixon | G06Q 30/02 709/225 |
| 2007/0011739 A1 | 1/2007 | Zamir et al. | |
| 2007/0016953 A1 | 1/2007 | Morris et al. | |
| 2007/0050444 A1 | 3/2007 | Costea et al. | |
| 2007/0067843 A1 | 3/2007 | Williamson et al. | |
| 2007/0094734 A1 | 4/2007 | Mangione-Smith et al. | |
| 2007/0107053 A1 | 5/2007 | Shraim et al. | |
| 2007/0124579 A1 | 5/2007 | Haller | |
| 2007/0130351 A1* | 6/2007 | Alperovitch | H04L 12/585 709/229 |
| 2007/0136808 A1* | 6/2007 | Xiong | G06F 21/566 726/22 |
| 2007/0143629 A1 | 6/2007 | Hardjono et al. | |
| 2007/0156886 A1 | 7/2007 | Srivastava | |
| 2007/0162349 A1 | 7/2007 | Silver | |
| 2007/0192855 A1 | 8/2007 | Hulten et al. | |
| 2007/0233782 A1 | 10/2007 | Tali | |
| 2007/0240222 A1 | 10/2007 | Tuvell et al. | |
| 2008/0005223 A1* | 1/2008 | Flake | G06F 17/30864 709/203 |
| 2008/0028463 A1 | 1/2008 | Dagon et al. | |
| 2008/0077994 A1 | 3/2008 | Comlekoglu | |
| 2008/0082628 A1 | 4/2008 | Rowstron et al. | |
| 2008/0082662 A1* | 4/2008 | Dandliker | H04L 63/10 709/225 |
| 2008/0104180 A1 | 5/2008 | Gabe | |
| 2008/0109244 A1 | 5/2008 | Gupta | |
| 2008/0109473 A1 | 5/2008 | Dixon et al. | |
| 2008/0109491 A1 | 5/2008 | Gupta | |
| 2008/0114709 A1 | 5/2008 | Dixon et al. | |
| 2008/0133540 A1* | 6/2008 | Hubbard | H04L 63/101 |
| 2008/0133972 A1 | 6/2008 | Verbowski et al. | |
| 2008/0137864 A1 | 6/2008 | Jin et al. | |
| 2008/0140442 A1 | 6/2008 | Warner | |
| 2008/0140820 A1 | 6/2008 | Snyder et al. | |
| 2008/0141366 A1 | 6/2008 | Cross et al. | |
| 2008/0189788 A1 | 8/2008 | Bahl | |
| 2008/0222726 A1 | 9/2008 | Chayes et al. | |
| 2008/0255977 A1 | 10/2008 | Altberg et al. | |
| 2008/0263677 A1 | 10/2008 | Kaditz et al. | |
| 2009/0125382 A1 | 5/2009 | Delepet | |
| 2009/0217370 A1* | 8/2009 | Hulten | G06F 21/51 726/16 |
| 2009/0254993 A1 | 10/2009 | Leone | |
| 2009/0282476 A1 | 11/2009 | Nachenberg et al. | |
| 2009/0319998 A1* | 12/2009 | Sobel | G06F 21/55 717/128 |
| 2009/0328209 A1 | 12/2009 | Nachenberg | |
| 2010/0005291 A1* | 1/2010 | Hulten | G06F 21/56 713/156 |
| 2010/0153354 A1 | 6/2010 | Buccella et al. | |
| 2010/0169970 A1 | 7/2010 | Stolfo et al. | |
| 2010/0211997 A1 | 8/2010 | McGeehan et al. | |
| 2011/0040825 A1 | 2/2011 | Ramzan et al. | |
| 2011/0055923 A1 | 3/2011 | Thomas | |
| 2011/0067101 A1 | 3/2011 | Seshadri et al. | |
| 2011/0225655 A1 | 9/2011 | Niemala et al. | |
| 2012/0197656 A1 | 8/2012 | Lang et al. | |
| 2012/0278264 A1 | 11/2012 | Deyo | |

OTHER PUBLICATIONS

Hwang, Kai; Kulkareni, S.; Hu, Yue, "Cloud Security with Virtualized Defense and Reputation-Based Trust Mangement," Dependable, Autonomic and Secure Computing, 2009. DASC '09. Eighth IEEE International Conference on , vol., no., pp. 717,722, Dec. 12-14, 2009.

Kilinc, C.; Booth, T.; Andersson, K., "WallDroid: Cloud Assisted Virtualized Application Specific Firewalls for the Android OS," Trust, Security and Privacy in Computing and Communications (TrustCom), 2012 IEEE 11th International Conference on , vol., no., pp. 877,883, Jun. 25-27, 2012.

International Search Report and Written Opinion, PCT Application No. PCT/US09/48328, Dec. 22, 2010, 8 pages.

Brin, S. et al., "The Anatomy of a Large-Scale Hypertextual Web Search Engine," Computer Networks and ISDN Systems, 1998, pp. 107-117, vol. 30, No. 1-7.

Christodorescu, M. et al., "Semantics-Aware Malware Detection," In Proceedings of the 205 IEEE Symposium on Security and Privacy, IEEE Computer Society, 2005.

Gonzalez, J. et al., "Residual Splash for Optimally Parallelizing Belief Propagation," AISTATS, 2009, 8 pages.

Gyongyi, Z. et al., "Combating Web Spam with Trustrank," Proceedings of the Thirtieth International Conference on Very Large Data Bases, VLDB Endowment, 2004, pp. 576-587, vol. 30.

Idika, N. et al., "A Survey of Malware Detection Techniques," Technical Report, Department of Computer Science, Purdue University, 2007, 48 pages.

Kephart, J. et al., "Automatic Extraction of Computer Virus Signatures," 4.sup.th Virus Bulletin International Conference, 1994, pp. 178-184.

Kleinberg, J., "Authoritative Sources in a Hyperlinked Environment," Journal of the ACM (JACM), 1999, pp. 604-632, vol. 46, No. 5.

Kolter, J. et al., "Learning to Detect and Classify Malicious Executables in the Wild," The Journal of Machine Learning Research, 2006, p. 2721-2744, vol. 7.

McGlohon, M. et al., "SNARE: A Link Analytic System for Graph Labeling and Risk Detection," Proceedings of the 15.sup.th ACM SIGKDD International Conference on Knowledge Discovery and Data mining, ACM, 2009, pp. 1265-1274, New York, N.Y.

Neville, J. et al., "Using Relational Knowledge Discovery to Prevent Securities Fraud," Proceedings of the Eleventh ACM SIGKDD International Conference on Knowledge Discovery in Data Mining, ACM, 2005, p. 458.

Neville, J. et al., "Collective Classification with Relational Dependency Networks," Workshop on Multi-Relational Data Mining (MRDM-2003), 2003.

Pandit, S. et al., "NetProbe: A Fast and Scalable System for Fraud Detection in Online Auction Networks," WWW '07, Proceedings of the 16th International Conference on World Wide Web, ACM, 2007, pp. 201-210, New York, N.Y.

(56) References Cited

OTHER PUBLICATIONS

Pei, J. et al., "On Mining Cross-Graph Quasi-Cliques," Proceedings of the Eleventh ACM SIGKDD International Conference on Knowledge Discovery in Data Mining, ACM, 2005, 11 pages.
Schultz, M. et al., "Data Mining Methods for Detection of New Malicious Executables," IEEE Symposium on Security and Privacy, IEEE Computer Society, 2001, pp. 38-49.
Siddiqui, M. et al., "A Survey of Data Mining Techniques for Malware Detection Using File Features," ACM-SE 46: Proceedings of the 46th Annual Southeast Regional Conference on XX, ACM, 2008, pp. 509-510, New York, N.Y.
Symantec Internet Security Threat Report, 36 pages, [Online] [Retrieved on Aug. 8, 2010] Retrieved from the Internet<URL:http://eval.symantec.com/mktginfo/enterprise/white_papers/b-whitepaper_exec_summary_internet_security_threat_report_xiii_04.sub_2008.en-us.pdf>.
Symantec Malware Definition, [Online] [Retrieved on Aug. 6, 2010] Retrieved from the Internet<URL:http://www.symantec.com/norton/security_response/malware.jsp>.
Symantec Norton Community Watch Privacy Policy, [Online] [Retrieved on Aug. 6, 2010] Retrieved from the Internet<URL:http://www.symantec.com/about/profile/policies/ncwprivacy-.jsp>.
Symantec Unveils New Model of Consumer Protection Codenamed "Quorum", 3 pages, [Online] [Retrieved on Aug. 8, 2010] Retrieved from the Internet<URL:https://www.symantec.com/about/news/release/article.jsp?p-rid=20090706_02>.
Tesauro, G. et al., "Neural Networks for Computer Virus Recognition," IEEE Expert, 1996, pp. 5-6, vol. 11, No. 4.
Tong, H. et al., "Fast Best-Effort Pattern Matching in Large Attributed Graphs," Proceedings of the 13th ACM SIGKDD International Conference on Knowledge Discovery and Data Mining, ACM, 2007, 10 pages.
Wang, W. et al., "GraphMiner: A Structural Pattern-Mining System for Large Disk-Based Graph Databases and Its Applications," Proceedings of the 2005 ACM SIGMOD International Conference on Management of Data, ACM, 2005, pp. 879-881.
Weaver, N. et al., "A Taxonomy of Computer Worms," Proceedings of the 2003 ACM Workshop on Rapid Malcode, ACM, 2003, pp. 11-18, New York, N.Y.
Yan, X. et al., "gSpan: Graph-Based Substructure Pattern Mining," Proceedings of the 2002 IEEE International Conference on Data Mining (ICDM '02), 2002, 4 pages.
Yan, X. et al., "Mining Closed Relational Graphs with Connectivity Constraints," Proceedings of the Eleventh ACM SIGKDD International Conference on Knowledge Discovery in Data Mining, ACM, 2005, p. 333.
Yedidia, J. et al., "Understanding Belief Propagation and Its Generalizations," Exploring Artificial Intelligence in the New Millennium, 2003, pp. 236-239, vol. 8.
Zeng, Z. et al., "Coherent Closed Quasi-Clique Discovery from Large Dense Graph Databases," Proceedings of the 12th ACM SIGKDD International Conference on Knowledge Discovery and Data Mining, ACM, 2006, 6 pages.
Zhu, X., "Semi-Supervised Learning with Graphs," 2005, 174 pages.
McAfee SiteAdvisor: What is SiteAdvisor Software? McAfee.RTM., 2009, [Online] [Retrieved on Jul. 23, 2009] Retrieved from the Internet<URL:http://www.siteadvisor.com/howitworks/index.html>.
"StopBadware.org—StopBadware.org Frequently Asked Questions," stopbadware.org, 2009, [Online] [Retrieved on Jul. 23, 2009] Retrieved from the Internet<URL:htto://www.stopbadware.org/home/faq>.
"TrustedSource.TM.: The Next-Generation Reputation System," Secure Computing Corporation, Oct. 2006, 6 pages.
Walsh, L., "Tidal Waves: Careful, Trend Micro Might Give You a Bad Web Reputation," ChannelWeb Network, Mar. 26, 2007, [Online] [Retrieved on Jun. 21, 2007] Retrieved from the Internet<URL:http://www.v3.crn.com/security/198500632>.
U.S. Appl. No. 12/059,258, filed Mar. 31, 2008, Inventors Sourabh Satish et al.
U.S. Appl. No. 12/059,271, filed Mar. 31, 2008, Inventors Brian Hernacki et al.
U.S. Appl. No. 12/165,599, filed Jun. 30, 2008, Inventor Carey S. Nachenberg.
U.S. Appl. No. 12/242,634, filed Sep. 30, 2008, Inventors Josephine Gibney et al.
U.S. Appl. No. 12/416,020, filed Mar. 31, 2009, Inventors Shane Pereira et al.
U.S. Appl. No. 12/831,004, filed Jul. 6, 2010, Inventors Carey S. Nachenberg et al.
U.S. Appl. No. 13/556,401, filed Jul. 24, 2012, Inventors Carey S. Nachenberg et al.
U.S. Appl. No. 13/677,914, filed Nov. 15, 2012, Inventors Duen Hong Chau et al.
U.S. Appl. No. 13/666,788, filed Nov. 1, 2012, Inventors Carey S. Nachenberg et al.
U.S. Appl. No. 13/558,177, filed Jul. 25, 2012, Inventors Scott Schneider et al.
Archive of "Abaca Products > Filtering Technology," www.abaca.com, [Online] [Archived by http://archive.org on Oct. 24, 2006; Retrieved on Apr. 11, 2013] Retrieved from the Internet<URL:http://web.archive.org/web/20061024023812/http://www.abac-a.com/product_technology.html>.
Aringhieri, R. et al., "Fuzzy Techniques for Trust and Reputation Management in Anonymous Peer-to-Peer Systems," Journal of the American Society for Information Science and Technology, 2006, pp. 528-537, vol. 57, No. 4, accessed Jan. 15, 2013 at <http://onlinelibrary.wiley.com/doil1 0.1 002/asi.20307/pdf>.
Colvin, R., Program Manager, SmartScreen, "Stranger Danger"—Introducing SmartScreen.RTM. Application Reputation, Oct. 13, 2010, pp. 1-9, can be retrieved at <http://blogs.msdn.com/b/ie/archive/2010/10/13/stranger-danger-introdu- cing-smartscreen-application-reputation.aspx>.
Trend Micro.TM., "Outthink the Threat," A Trend Micro eBook, 2008, pp. 1-17, can be retrieved at <http://uk.trendmicro.com/imperia/md/content/campaigns/thinkagain/thin-kagain_ebook.pdf>.
White, R., "How Computers Work," Que, Oct. 2003, 44 pages.
Xie, Y. et al., "Innocent by Association: Early Recognition of Legitimate Users," Oct. 16-18, 2012, CCS '12: Proceedings of the 2012 ACM Conference on Computer and Communications Security, pp. 353-364.
United States Office Action, U.S. Appl. No. 12/407,772, Jan. 9, 2014, 14 pages.
United States Office Action, U.S. Appl. No. 12/407,772, May 13, 2013, 15 pages.
United States Office Action, U.S. Appl. No. 12/407,772, Sep. 25, 2012, 13 pages.
United States Office Action, U.S. Appl. No. 12/407,772, Feb. 29, 2012, 13 pages.
United States Office Action, U.S. Appl. No. 12/407,772, Oct. 13, 2011, 13 pages.
Walsh, K., "Fighting Peer-to-Peer SPAM and Decoys with Object Reputation," ACM, Aug. 22-26, 2005, pp. 1-6.
Tran et al., "A Trust Based Access Control Framework for P2P File-Sharing Systems," Proceedings of the 38th Annual Hawaii International Conference on System Sciences, HICSS '05, 2005, Jan. 3-6, 2005, pp. 1-10.
Werner, "Redefining Computer Literacy in the Age of Ubiquitous Computing," Proceeding SIGITE '05 Proceedings of the 6th Conference on Information Technology Education, ACM Digital Library, 2005, pp. 95-99.

\* cited by examiner

COMMUNICATION-BASED REPUTATION SYSTEM

CROSS REFERENCE TO RELATED APPLICATION

This application is a continuation of U.S. patent application Ser. No. 12/407,772, titled "Communication-Based Reputation System" and filed on Mar. 19, 2009, the contents of which are incorporated by reference in its entirety.

BACKGROUND OF THE INVENTION

1. Field of the Invention

This invention pertains in general to computer security and in particular to the identification of malware.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

Software applications that are downloaded and installed on a user client can either be vulnerable to malware attacks or contain malware. Usually the software applications are downloaded and installed by a user who has some knowledge of the reputation associated with the software application (e.g. knowledge of a reputation of the manufacturer of the software, knowledge of the reliability of the software application). Knowledge of the reputation of the software allows the user to assess the likelihood that the software application is malicious. However, in the case of malware, the software applications can be downloaded or installed on the user's client without the user's knowledge. Thus, even if all the applications on the client known to the user have good reputations, this does not guarantee that the client is free of malware.

Software applications installed on a user's client may be automatically detected by security software programs but it can be difficult for even the security software to assess the reputation of all of the software applications installed on a user's client. Because of the large number of software applications that are constantly being introduced in modern computing environments, reputation information is not known for many software applications. It is particularly difficult to assess the reputation of malware because of "polymorphisms" or engineered variations in the malware which cause the security software to identify it as a different software application.

Accordingly, there is a need in the art for improved methods of assessing the reputations of software applications installed on clients.

BRIEF SUMMARY

The above and other needs are met by systems, methods, and computer program products for determining a reputation associated with an entity.

One aspect provides a computer-implemented method for determining a reputation associated with an entity. A communication between the entity and a host is identified. Reputation information associated with a set of other entities that communicate with the host is identified. A reputation score associated with the host is generated based on the reputation information associated with the set of other entities. A reputation score associated with the entity is generated based on the reputation score associated with the host.

Another aspect is embodied as a computer-readable storage medium encoded with computer program code for determining a reputation associated with an entity. The program code identifies a communication between a host and the entity at a client. The program code transmits information uniquely identifying the entity and the host to a server. The program code also receives a reputation score associated with the entity from the server, wherein the server determines the reputation score associated with the host responsive to: identifying reputation information associated with a set of other entities that communicate with the host, generating a reputation score associated with the host based on the reputation information associated with a set of other entities and generating a reputation score associated with the entity based on the reputation score associated with the host.

In another aspect, the described embodiments provide a computer system for determining a reputation associated with an entity. The system comprises a processor and a memory. The system comprises a reporting module stored in the memory and executable by the processor to identify a communication between the entity and a host. The system further comprises a host reputation scoring module stored in the memory and executable by the processor to identify reputation information associated with a set of other entities that communicate with the host and generate a reputation score associated with the host based on the reputation information associated with a set of other entities. The system further comprises an entity reputation scoring module stored in the memory and executable by the processor to generate a reputation score associated with the entity based on the reputation score associated with the host.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
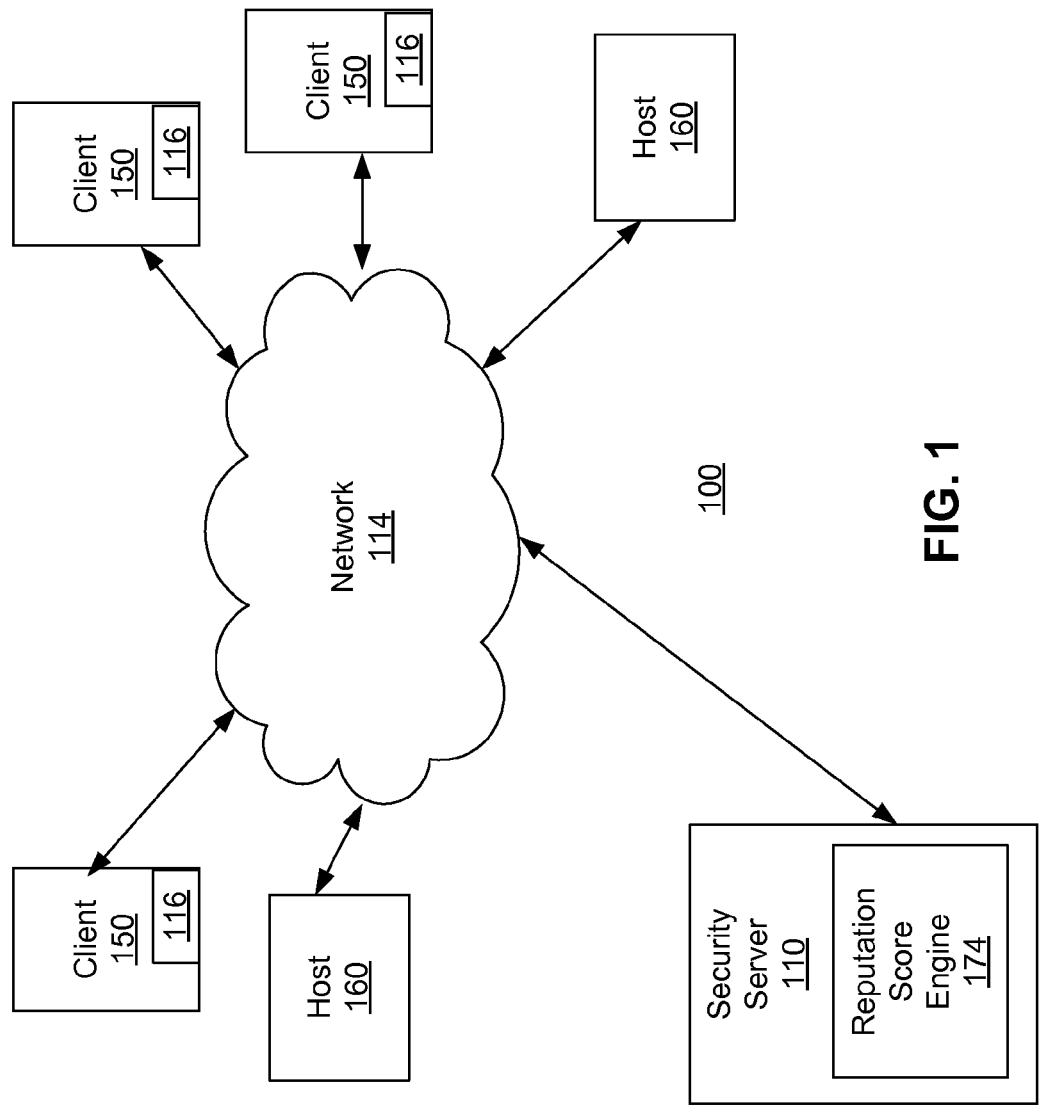
FIG. 1 is a high-level block diagram of a computing environment 100 according to one embodiment.

FIG. 1 is a high-level block diagram of a computing environment 100 according to one embodiment. FIG. 1 illustrates a security server 110 and three clients 150 connected by a network 114. Only three clients 150 are shown in FIG. 1 in order to simplify and clarify the description. Embodiments of the computing environment 100 can have thousands or millions of clients 150 connected to the network 114.

Each of the clients 150 executes a security module 116 to identify and monitor entities such as files or software applications installed on the clients 150 and the behavior of the entities. The security module 116 monitors the entities that are installed on the client 150 to identify the hosts 160 that the entities communicate with through the network 114. A host 160 can be any type of computer system that stores software applications, executable code, or files, such as a web site provider. The security module 116 transmits information regarding the entities installed on the client 150 and the hosts 160 that the entities communicate with to the security server 110.

The security server 110 interacts with the clients 150 via the network 114 to receive information describing the entities installed on the clients 150 and their communications with hosts 160. The security server 110 executes a reputation score engine 174 to generate reputation scores for the hosts 160 and the entities. The reputation scores for the hosts can be based at least in part on the reputations of entities that communicate with the hosts and client hygiene scores which describe the likelihood that the clients 150 will be exposed to malware threats. Similarly, the reputation scores for the entities can be based at least in part on the reputations of the hosts 160 with which the entities communicate. The security server 110 further stores and uses additional information associated with at least some of the entities to assess the reputations of the entities, such as: parties associated with the entities (e.g. developers, publishers, and companies), the number of users of the entities, information indicating whether or not the entities are associated with degradations in system performance, etc.

For example, an entity with an unknown reputation which communicates with a host with a reputation score indicating a good reputation may be assigned a reputation score indicating a good reputation. Conversely, an entity which communicates with a host that has reputation score indicating a bad reputation may be assigned a reputation score indicating a bad reputation.

The security server 110 provides the generated reputation scores associated with hosts 160 and entities to the security modules 116 executed by the clients 160. Based on the generated reputations scores, the security modules 116 may perform remediation actions such as removing the entities from the clients 150 or providing users with indications of the reputation scores associated with the entities.

In one embodiment, a client 150 is a computer used by one or more users to perform activities including downloading, installing, and/or executing entities such as files and/or software applications. The client 150, for example, can be a personal computer executing a web browser such as MICROSOFT INTERNET EXPLORER that allows the user to retrieve and display content from web servers and other hosts 160 on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software applications or other entities that might constitute malware or other threats. For example, a client 150 can be a network gateway located between an enterprise network and the Internet.

This approach leverages the information obtained from monitoring communications between entities at clients 150 and hosts 160 in order to generate reputation scores for both the hosts 160 and the entities based on reputation information associated with the entities, such as the hygiene scores of the clients 150 on which the entities are installed. A reputation score may be generated for a host 160 even if reputation information is known only for a small number of the entities that communicate with the host 160. For entities with no or little known reputation information, reputation scores may be generated based on the reputation scores associated with the hosts 160 with which the entities communicate. Therefore, the host 160 and its associated reputation score is used as a proxy to determine reputation scores associated with entities based on the other entities who communicate with the same host 160.

Using host 160 reputation as a proxy for entity reputation also provides a beneficial increase in the accuracy of malware identification. As the hosts 160 that malware applications communicate with are less frequently affected by changes or polymorphisms, assigning reputation scores to the software applications based on reputation scores associated with the hosts allows for identification of polymorphic malware. Thus, the approach is well-suited to computing environments in which clients 150 are exposed to numerous malware threats that exhibit polymorphic variance.

This approach further reduces false positive identification of malware by providing additional information that can be used to assess the reputation of unknown software applications that may otherwise be identified as malware. By identifying that unknown software applications communicate with the hosts 160 with good reputations, the unknown software applications may be provided with reputation scores indicating good reputations, thus reducing the rate of false positive identifications of malware.

The network 114 represents the communication pathways between the security server 110 and clients 150. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
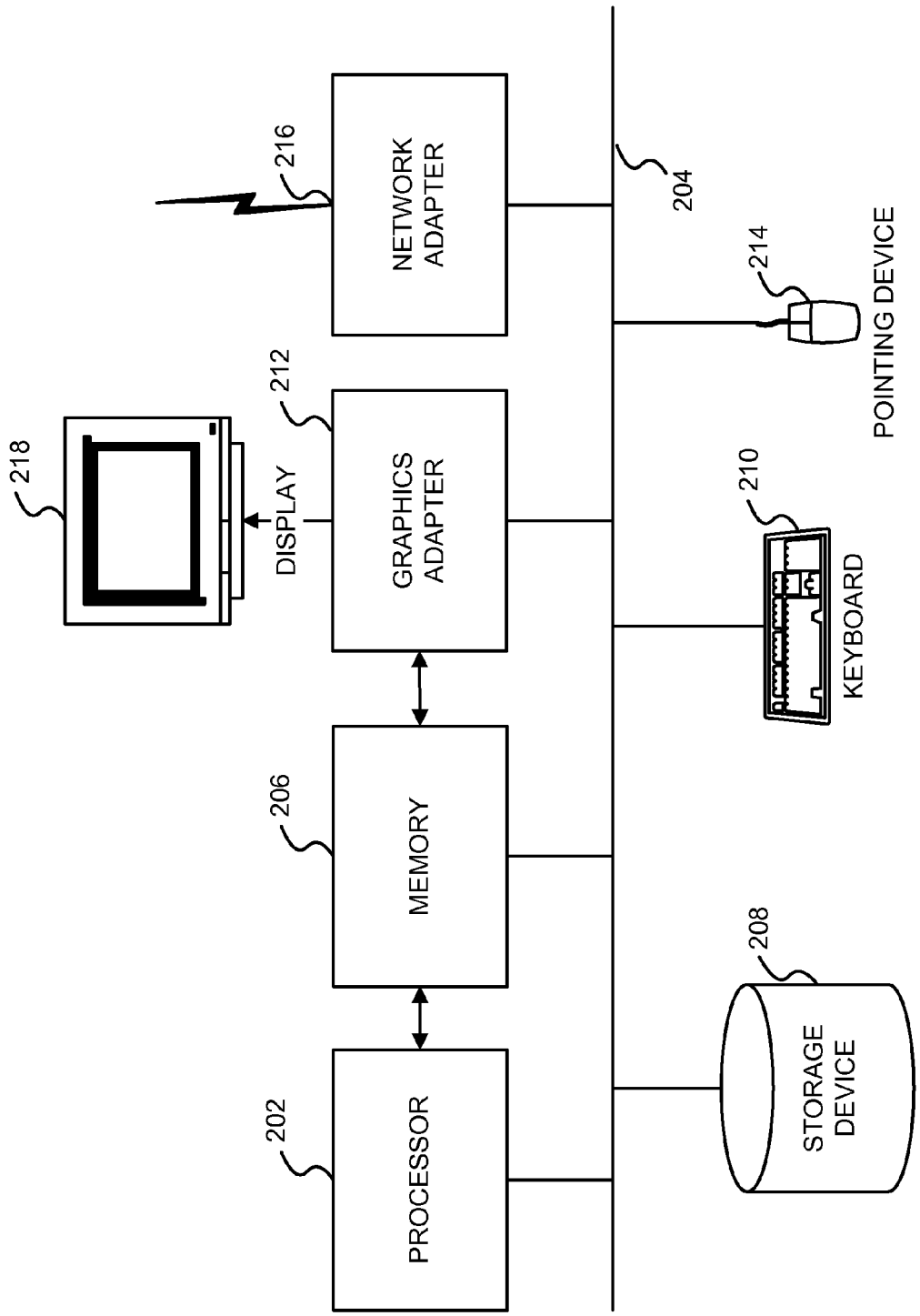
FIG. 2 is a high-level block diagram illustrating a typical computer for use as a security server 110 or a client 150.

FIG. 2 is a high-level block diagram illustrating a typical computer 200 for use as a security server 110, client 150, or host 160. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other computer-readable storage medium, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 150 that is a mobile telephone typically has limited processing power, a small display 218, and might lack a pointing device 214. The security server 110, in contrast, may comprise multiple blade servers working together to provide the functionality described herein.

Figure 3:
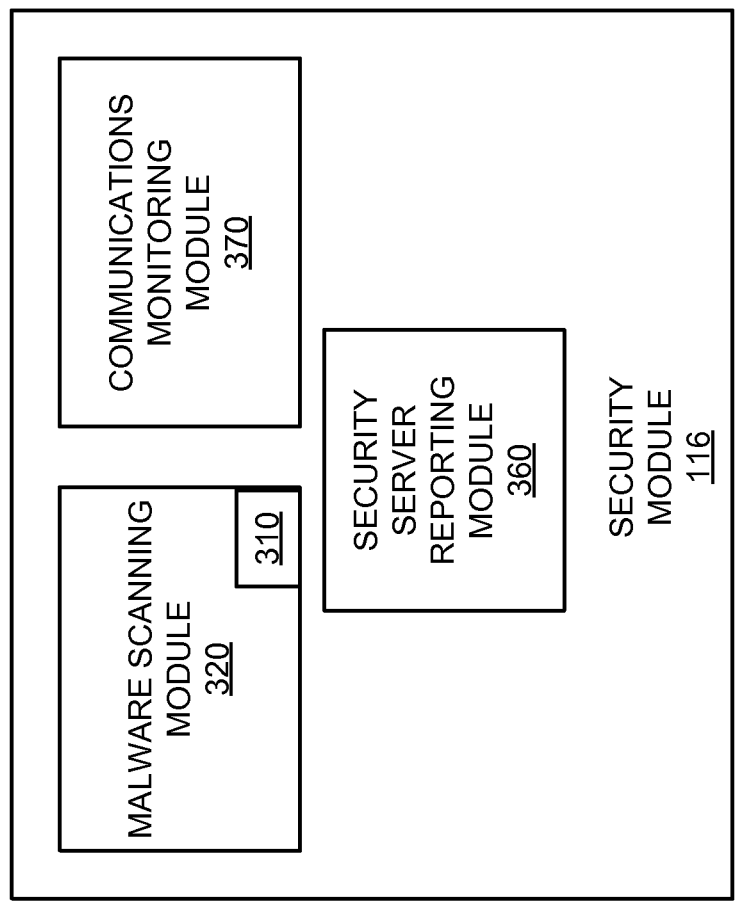
FIG. 3 is a high-level block diagram illustrating a detailed view of a security module 116 according to one embodiment.

FIG. 3 is a high-level block diagram illustrating a detailed view of the security module 116 according to one embodiment. In some embodiments, the security module 116 is incorporated into an operating system executing on the client 150 while in other embodiments the security module 116 is a standalone application or part of another product. As shown in FIG. 3, the security module 116 includes multiple modules. Those of skill in the art will recognize that other embodiments of the security module 116 can have different and/or other modules than the ones described here, and that the functionalities can be distributed among the modules in a different manner.

The malware scanning module 320 identifies entities installed on the client 150. The malware scanning module 320 scans the storage device 208 or memory 206 associated with the client 150 to identify information associated with entities such as files or software applications that are installed or stored on the storage device 208 or memory 206. According to the embodiment, the malware scanning module 320 may scan the storage device 208 or memory 206 associated with the client 150 at a scheduled time or whenever a new entity is installed, stored, or executed on the client 150.

In some embodiments, the malware scanning module 320 communicates with the communications monitoring module 370 in order to identify entities such as files or software applications based on network communications. In these embodiments, the malware scanning module 320 receives information from the communications monitoring module 370 indicating entities the communications monitoring module 370 identifies through monitoring network communications on the network 114.

The malware scanning module 320 communicates with the security server 110 using the security server reporting module 360 to receive reputation information associated with the entities, such as entity reputation scores. The reputation information for the entities may indicate that the entity has a good reputation, a bad reputation or an unknown reputation. According to the embodiment, the malware scanning module 320 may receive reputation information for only newly identified entities or the malware scanning module 320 may receive reputation information for all previously identified entities. In embodiments where updated reputation information is received for all previously identified entities, the malware scanning module 320 may receive updated reputation information on a periodic basis (e.g. daily, weekly or monthly).

Based on the reputation information associated with the entities, the malware scanning module 320 may remove the entities from the client 150 and/or otherwise remediate the client 150. For instance, if an entity detected by the malware scanning module 320 is associated with reputation information indicating a very bad reputation, the malware scanning module 320 determines that the entity is a malware threat. Responsive to determining that the entity is a malware threat, the malware scanning module 320 may remediate the client 150, for example by removing the entity and/or repairing corrupted entities on the client 150. In alternate embodiments, the malware scanning module 320 may display the reputation information associated with the entity to a user of the client 150 in association with a prompt which allows the user to elect whether or not to remove the entity.

The malware scanning module 320 further functions to generate and store a hygiene score associated with the client 150. The hygiene score associated with the client 150 indicates a likelihood that the client 150 will be exposed to malicious software (i.e. malware threats) and is based, in part, on the number of malware threats detected on the client 150. The hygiene score may be based, for example, on a frequency at which malware threats are detected on the client 150. The hygiene score associated with the client 150 may further be based on security software installed on the client 150 (e.g. a number of security patches installed on the client 150) or settings associated with the security software installed on the client 150.

The malware scanning module 320 further communicates with the communications monitoring module 370 in order to analyze the behavior of the entities. According to the embodiment, the malware scanning module 320 may communicate with the communications monitoring module 370 to analyze the behavior of all of the entities or newly identified entities with unknown reputation information. In some embodiments, the malware scanning module 320 quarantines entities with unknown reputation information. The entity may be quarantined, for example, by executing the entity in a secure or "sandbox" environment and/or taking other actions to prevent any malicious code in the entity from causing harm to the client 150.

The communications monitoring module 370 monitors the entities executing on the client 150 in order to identify the hosts 160 that the entities communicate with. The communications monitoring module 370 transmits information regarding the entities and the hosts 160 that the entities communicate with to the security server reporting module 360. The communications monitoring module 370 monitors the network traffic associated with the client 150 to identify communications with hosts 160 initiated by the entities and communications with entities initiated by hosts 160. In one embodiment, the communications monitoring module 370 continuously monitors network traffic to identify communications initiated by all entities executing on the client. In some embodiments, the communications monitoring module 370 monitors only network traffic of entities that have an unknown reputation.

The security server reporting module 360 communicates with the security server 110 via the network 114. The security server reporting module 360 transmits information used to uniquely identify the entities and the hosts 160 that the entities communicate with to the security server 110. Information uniquely identifying hosts 160 may include: a name associated with the host 160, a country associated with the host 160, an internet protocol address associated with the host 160 and a uniform resource locator associated with the host 160. Information used to uniquely identify an entity may include a name associated with the entity, a date stamp associated with the entity (e.g. a date when the entity was downloaded), a fingerprint associated with the entity, and any other type of data or metadata that can be used to uniquely identify the entity. Metadata that can be used to uniquely identify the entity can include: instructions performed by the entity, hashes generated from the entity, the size of the entity, bit sequences generated from the entity, strings referenced in information associated with the entity and other entities associated with the entity. The security server reporting module 360 further transmits information which uniquely identifies the client 150 on which the security module 116 is executing in association with the hygiene score of the client 150.

The security server reporting module 360 further receives reputation scores associated with the hosts 160 and/or the entities from the security server 110. The security server reporting module 360 transmits the received reputation scores to the malware scanning module 320. Based on the received reputation scores, the malware scanning module 320 may remove the entities from the client 150 and/or remediate the client.

Figure 4:
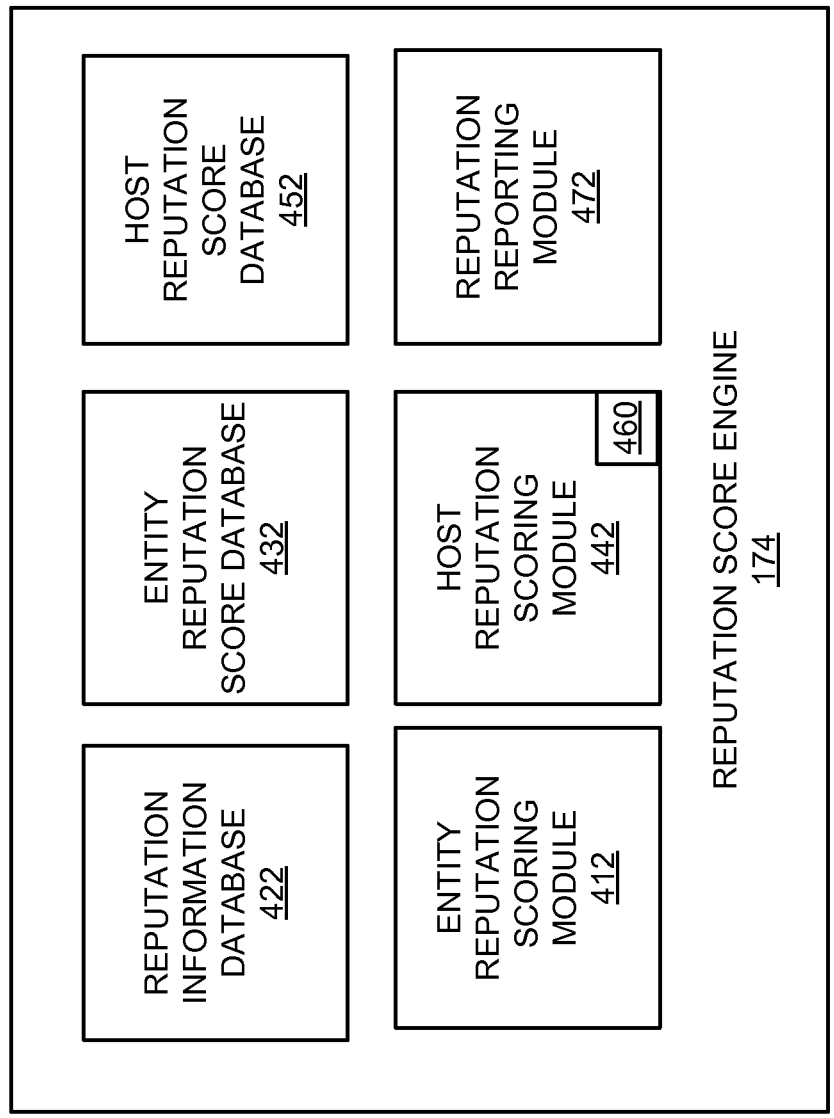
FIG. 4 is a high-level block diagram illustrating a detailed view of a reputation score engine 174 according to one embodiment.

FIG. 4 is a high-level block diagram illustrating a detailed view of the reputation score engine 174 according to one embodiment. As shown in FIG. 4, the reputation score engine 174 includes several modules. Those of skill in the art will recognize that other embodiments of the reputation score engine 174 can have different and/or other modules than the ones described here, and that the functionalities can be distributed among the modules in a different manner.

The reputation information database 422 stores reputation information for the entities found on clients 150 in association with unique identifiers for the entities. The reputation information can include information provided by the clients 150 and/or information provided by other sources. In one embodiment, the reputation information in the database 422 includes information describing entities and the hosts 160 with which the entities communicate, including unique identifiers for both the entities and the hosts. This reputation information is typically provided by the clients 150 that observe the communications.

The reputation information in the database 422 can also include information about entities provided by a security software provider, such as by the provider of the security modules 116 at the clients. This information can include, for example, information indicating a number of clients 150 a given entity is installed on, a frequency at which the entity is installed on clients 150, a rate at which the entity is uninstalled from clients 150, hygiene scores associated with clients 150 the entity is installed on, security settings associated with clients 150 the entity is installed on, information regarding any known degradations to system performance associated with the entity, the date on which the entity was identified on the client 150, the last report of the entity, and a party associated with the manufacture or development of the entity. These types of information can be used to assess the reputation of an entity. For example, an entity that is installed on many clients 150 having hygiene scores indicating that the clients 150 have low likelihoods of being exposed to malware threats is unlikely to be a malware threat and therefore can be given a good reputation.

The entity reputation scoring module 412 generates entity reputation scores for entities based on the reputation information stored in the reputation information database 422. Entity reputation scores summarize whether the entities are associated with good or bad reputations, where an entity with a bad reputation represents potential malware. In one embodiment, the entity scoring module 412 generates a series of continuous scores ranging from a score indicating a very good reputation to a score indicating a very bad reputation. In another embodiment, the entity scoring module 412 generates binary score indicating that an entity either has a good reputation or a bad reputation.

The entity reputation scoring module 412 may combine the reputation information associated with an entity in any way in order to generate an entity reputation score associated with an entity. In some embodiments, the entity reputation scoring module 412 combines values for different types of reputation information associated with an entity to generate an entity reputation score for the entity. The values associated with different types of reputation information may differ in magnitude according to the relative importance of the reputation information. For example, a value associated with information that indicates that the entity is installed on high number of clients 150 may have a larger magnitude than a value associated with information indicating a reputation of a developer of the entity.

The entity reputation scoring module 412 may further weight the values differently in combining the values to generate an entity reputation score. In one embodiment, the entity scoring module 412 may assign values which indicate a bad reputation more weight than values indicating a good reputation in combining the values to generate an entity reputation score. If there is no information associated with an entity in the reputation information database 422, the entity scoring module 412 may either give the entity a score indicating a bad reputation or a score indicating an unknown reputation.

In instances where the hosts 160 that the entities communicates with and their associated host reputation scores are known, the entity scoring module 412 may assign the host reputation scores a greater weight than values representing other reputation information in combining the values to generate entity reputation scores for the entities.

The entity reputation scoring module 412 re-generates entity reputation scores based on new reputation information added to the reputation information database 422. Specifically, the entity reputation scoring module 412 re-generates entity reputation scores for an entity when new host reputation scores associated with hosts 160 the entity communicates with are added or updated in the reputation information database 422. In this embodiment, the entity reputation scoring module 412 may communicate directly with the host reputation scoring module 442 to receive indications of the newly generated host reputation scores. In some embodiments, the entity reputation scoring module 412 may also periodically re-generate the entity reputation scores based on reputation information which does not include the host reputation scores. The entity reputation scoring module 412 stores the entity reputation scores in association with unique identifiers for the entities in the entity reputation score database 432.

The host reputation scoring module 442 generates host reputation scores which indicate the reputation of the hosts 160 based on reputation scores and/or reputation information associated with the entities that communicate with the host including the hygiene scores associated with the clients 150 on which the entities are identified. The host reputation scoring module 442 stores the host reputation scores in association with information used to uniquely identify the hosts 160 in the host reputation score database 452.

In one embodiment, the host reputation scoring module 442 combines the entity reputation scores associated with the entities that communicate with a host 160 and the hygiene scores associated with the clients 150 on which the entities are identified in order to generate a host reputation score for the host. The host reputation scoring module 442 may normalize the entity reputation scores and the hygiene scores in any way such that the entity reputation scores and hygiene scores are comparable. In one embodiment, the host reputation scoring module 442 selects an average or percentile value of the entity reputation scores and/or the hygiene scores as the host reputation score. According to the embodiment, the host reputation scoring module 422 may weigh entity reputation scores indicating an unknown or bad reputation higher than entity reputation scores indicating a good reputation before combining the scores to generate a host reputation score for the host 160. Likewise, the host reputation scoring module 422 may weigh hygiene scores indicating that a client 150 has a high likelihood of being exposed to malware threats higher than entity reputation scores indicating a good reputation before combining the scores to generate a host reputation score for the host 160.

In another embodiment, the host reputation scoring module 442 generates the host reputation score for a host 160 by applying a classifier 460 to the reputation information associated with entities that communicate with the host 160. In this embodiment, the host reputation scoring module 442 generates a classifier 460 based on a training set of reputation information associated with entities that communicate with hosts 160 that are known to have good reputations and a training set of reputation information associated with entities that communicate with hosts 160 that are known to have bad reputations. According to the embodiment, the host reputation scoring module 442 may use any type of machine learning algorithm to generate the classifier 460 such as Bayesian algorithms, Support Vector Machine algorithms or regression-based algorithms. The classification algorithm used by the host reputation scoring module 442 learns a set of values which specify the relative importance of the different types of reputation information and their associated values in determining whether the host is associated with a good reputation or a bad reputation and stores these values as a classifier 460. The host reputation scoring module 442 applies the values specified in the classifier 460 to reputation information associated with entities that communicate with hosts 160 in order to generate the host reputation score for the host 160.

The reputation reporting module 472 communicates with the security modules 116 of the clients 150 via the network 114. The reputation reporting module 472 receives information used to uniquely identify the entities and the hosts 160 that the entities communicate with from the security modules 116. The reputation reporting module 472 stores the information indicating the hosts 160 the entities communicate with in the reputation information database 422. The reputation reporting module 472 also retrieves entity reputation scores and/or entity reputation information associated with the entities from the entity reputation score database 432 and the reputation information database 422 and transmits the reputation scores and/or reputation information associated with the entities to the security modules 116 on the clients 110. The reputation reporting module 472 further retrieves host reputation scores associated with the hosts 160 from the host reputation score database 452 and transmits the host reputation scores to the security modules 116 on the clients 150.

Figure 5:
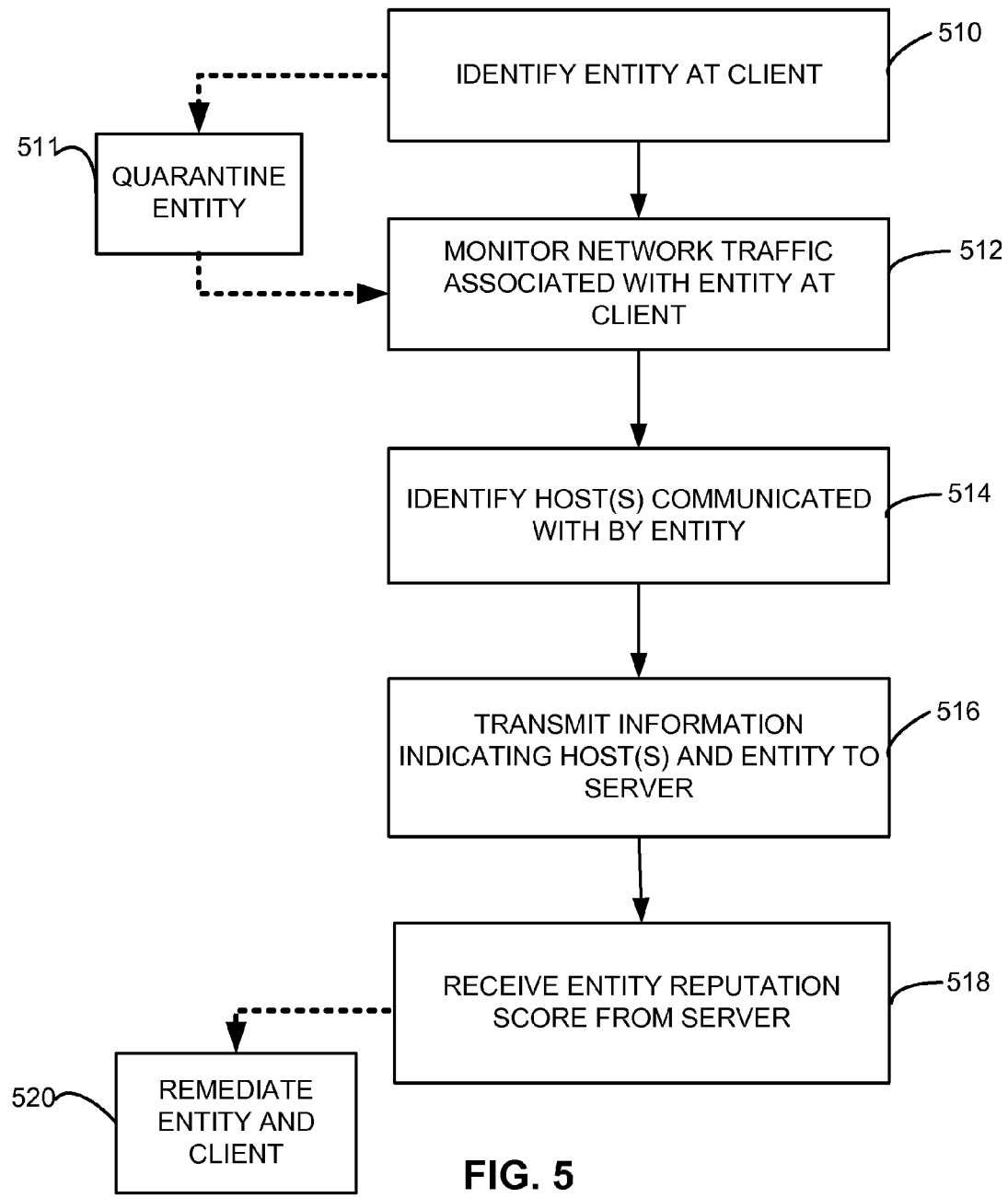
FIG. 5 is a flowchart illustrating steps performed by the security module 116 to monitor and report communications according to one embodiment.

FIG. 5 is a flowchart illustrating steps performed by the security module 116 to receive entity reputation scores from the security server 110. Other embodiments perform the illustrated steps in different orders, and/or perform different or additional steps. Moreover, some of the steps can be performed by engines or modules other than the security module 116.

The security module 116 identifies 510 an entity at the client 150. The entity can be identified by scanning the client 150 or by monitoring network traffic to detect communications associated with the entity. In some embodiments, the security module 116 quarantines 511 the entity in a secure or "sandbox" environment responsive to identifying that the entity is associated with an entity reputation score indicating that the entity is of unknown reputation. The security module 116 monitors 512 network traffic associated with the entity. The security module 116 identifies 514 a set of hosts 160 that the entity communicates with based on the network traffic associated with the entity. The security module 116 transmits 516 information to the security server 110, the information uniquely identifying the entity and the set of hosts 160 that the entity communicates with. The security module 116 receives 518 an entity reputation score associated with the entity from the security server 110, where the entity reputation score can be based at least in part on host reputation scores associated with the set of hosts 160 the entity communicates with. In some embodiments, the security module 116 remediates 520 the entity and the client 150 responsive to determining that the entity is associated with a entity reputation score indicating a bad reputation.

Figure 6:
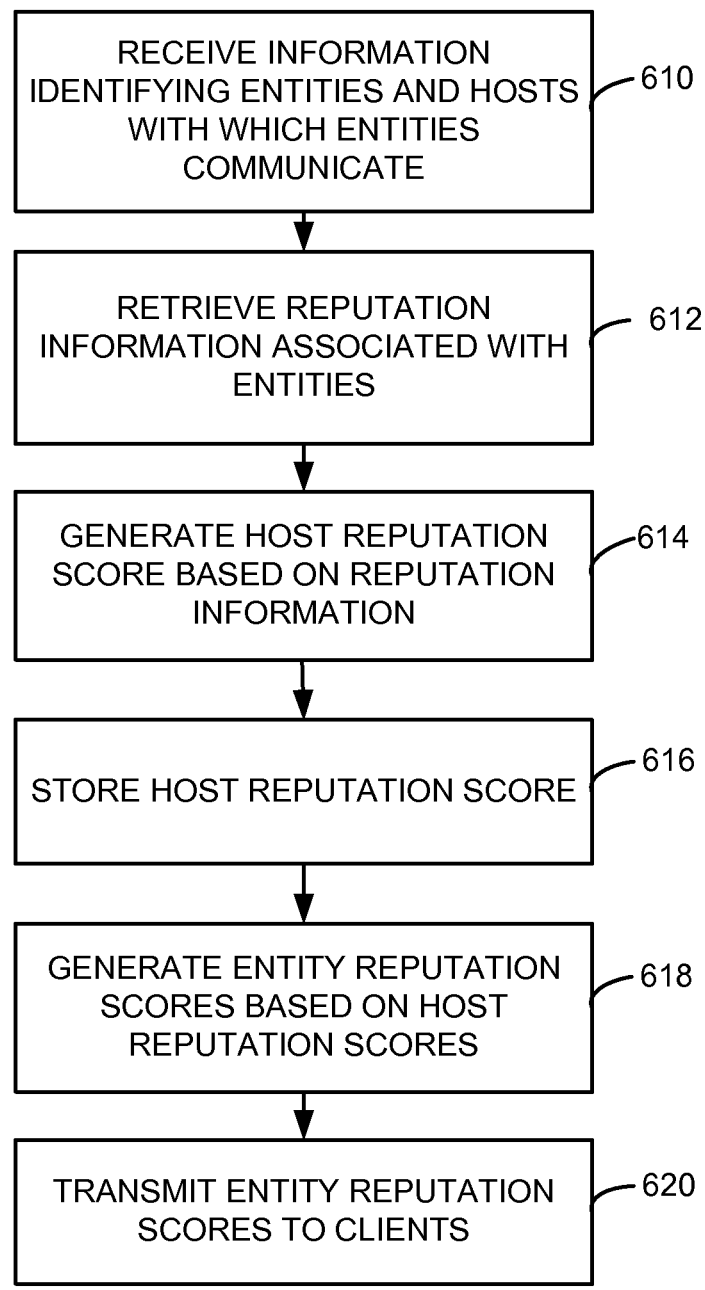
FIG. 6 is a flowchart illustrating steps performed by the reputation score engine 174 to generate host reputation scores and entity reputation scores according to one embodiment.

FIG. 6 is a flowchart illustrating steps performed by the reputation score engine 174 to generate host reputation scores and entity reputation scores according to one embodiment. Other embodiments perform the illustrated steps in different orders, and/or perform different or additional steps. Moreover, some of the steps can be performed by engines or modules other than the reputation score engine 174.

The reputation score engine 174 receives 610 information identifying entities and the hosts 160 that the entities communicate with from the clients 150. The reputation score engine 174 retrieves 612 reputation information associated with the set of entities that communicate with a given host 160. The reputation score engine 174 generates 614 a host reputation score based on the reputation information associated with the set of entities that communicate with the host 160, such as reputation scores associated with the set of entities that communicate with the host 160 and hygiene scores associated with the clients 150 on which the entities are identified. In one embodiment, the reputation score engine 174 combines reputation scores associated with the set of entities and hygiene scores associated with the clients 150 on which the entities are identified to generate 614 the host reputation score. In another embodiment, the reputation score engine 174 generates 614 the host reputation score by applying a classifier 460 to the reputation information associated with the entities, including the hygiene scores associated with the clients 150 on which the entities are identified. The reputation score engine 174 stores 616 the host reputation score in the host reputation score database 422.

The reputation score engine 174 also generates 618 entity reputation scores for the set of entities that communicate with the host 160 based on the generated host reputation scores. The reputation score engine 174 transmits 620 the generated entity reputation scores to the clients 150.

The above description is included to illustrate to a client 150 according to one embodiment. Other embodiments the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of providing security against a first entity that communicates with a host, the method comprising:
   identifying reputation information indicating reputations of second entities that communicate with the host;
   generating a host reputation score indicating a reputation of the host based on the reputation information indicating reputations of the second entities that communicate with the host;
   generating, by a computer, an entity reputation score indicating a likelihood that the first entity that communicates with the host is malware based on the host reputation score indicating the reputation of the host, the first entity comprising a file or software application that communicates with the host when executing on a first client;
   and transmitting the entity reputation score to the first client for malware remediation.

2. The method of claim 1, wherein the reputation information indicating reputations of the second entities comprises a plurality of hygiene scores associated with a plurality of second clients on which the second entities are identified, a hygiene score for a second client indicating a likelihood that the second client will be exposed to malware threats.

3. The method of claim 1, wherein the reputation information indicating reputations of the second entities comprises reputation scores associated with the second entities and generating the host reputation score comprises:
   combining the reputation scores associated with the second entities.

4. The method of claim 1, wherein generating the host reputation score comprises:
   applying a classifier to the reputation information indicating reputations of the second entities that communicate with the host.

5. The method of claim 4, further comprising:
   identifying a first training set of reputation information associated with a set of the second entities that communicate with hosts with known good reputations;
   identifying a second training set of reputation information associated with a set of the second entities that communicate with hosts with known bad reputations; and
   generating the classifier based on the first training set and the second training set.

6. The method of claim 1, further comprising:
   receiving, from the first client, information identifying the first entity and the host that the first entity communicates with.

7. The method of claim 1, wherein the first entity comprises a file or software application that initiates communication with the host when the first entity is executed on the client.

8. A non-transitory computer-readable storage medium encoded with executable computer program code for computer security, the program code comprising program code for:
   identifying, at a first client, a communication between a first entity and a host that the first entity communicates with, the first entity comprising a file or software application that communicates with the host when executing on a first client;
   transmitting, to at least one server, information identifying the entity and the host;
   receiving, from the at least one server, an entity reputation score indicating a likelihood that the entity is malware, the entity reputation score determined by:
      identifying reputation information indicating reputations of second entities that communicate with the host;
      generating a host reputation score indicating a reputation of the host based on the reputation information indicating reputations of the second entities that communicate with the host; and
      generating the entity reputation score indicating the likelihood that the first entity is malware based on the host reputation score indicating the reputation of the host; and
   remediating the first client responsive to determining that the entity reputation score indicates that the first entity has a high likelihood of containing malware.

9. The non-transitory computer-readable storage medium of claim 8, further comprising program code for:
   generating a hygiene score associated with the first client, wherein the hygiene score indicates a likelihood that the first client will be exposed to malware threats; and
   transmitting, to the at least one server, the hygiene score associated with the first client.

10. The non-transitory computer-readable storage medium of claim 8, wherein the reputation information indicating reputations of the set of second entities that communicate with the host comprises hygiene scores associated with a plurality of second clients on which the second entities are identified, a hygiene score for a second client indicating a likelihood that the second client will be exposed to malware threats.

11. The non-transitory computer-readable storage medium of claim 8, further comprising program code for:
   monitoring network traffic associated with the first entity.

12. The non-transitory computer-readable storage medium of claim 8, wherein the first entity comprises a file or software application that initiates the communication with the host when the first entity is executed on the client.

13. A computer system for providing security against a first entity that communicates with a host, the computer system comprising:
   a hardware processor; and
   a memory storing instructions that are executable by the hardware processor to:
      identify reputation information indicating reputations of second entities that communicate with the host;
      generate a host reputation score indicating a reputation of the host based on the reputation information indicating reputations of the second entities that communicate with the host;
      generate an entity reputation score indicating a likelihood that the first entity that communicates with the host is malware based on the host reputation score indicating the reputation of the host, the first entity comprising a file or software application that communicates with the host when executing on a first client; and
      transmit the entity reputation score to the first client for malware remediation.

14. The system of claim 13, wherein the reputation information indicating reputations of the second entities comprises a plurality of hygiene scores associated with a plurality of second clients on which the second entities are identified, a hygiene score for a second client indicating a likelihood that the second client will be exposed to malware threats.

15. The system of claim 13, wherein the reputation information indicating reputations of the second entities comprises reputation scores associated with the second entities and generating the host reputation score comprises:
  combining the reputation scores associated with the second entities.

16. The system of claim 13, the instructions further comprising instructions for:
  applying a classifier to the reputation information indicating reputations of the second entities that communicate with the host.

17. The system of claim 16, the instructions further comprising instructions for:
  identifying a first training set of reputation information associated with a set of the second entities that communicate with hosts with known good reputations;
  identifying a second training set of reputation information associated with a set of the second entities that communicate with hosts with known bad reputations; and
  generating the classifier based on the first training set and the second training set.

18. The system of claim 13, the instructions further comprising instructions for:
  receiving, from the first client, information identifying the first entity and the host that the first entity communicates with.

19. The system of claim 13, wherein the first entity comprises a file or software application that initiates communication with the host when the first entity is executed on the client.

* * * * *